(12) United States Patent
Nakhei-Nejad

(10) Patent No.: US 6,422,137 B1
(45) Date of Patent: Jul. 23, 2002

(54) PISTACHIO HULLER

(76) Inventor: Mohammad Nakhei-Nejad, #402, 10721 Saskatchowan Drive, Edmonton, AB (CA), T6E 6J5

( * ) Notice: Subject to any disclaimer, the term of this patent is extended or adjusted under 35 U.S.C. 154(b) by 10 days.

(21) Appl. No.: 09/681,837

(22) Filed: Jun. 14, 2001

(51) Int. Cl.$^7$ .............. B02B 3/08; B02B 3/04; B02B 3/02

(52) U.S. Cl. .............. 99/621; 99/618; 99/617; 99/609

(58) Field of Search .......... 99/574, 580, 581, 99/585, 600, 609, 611, 617, 618, 621, 625, 628

(56) References Cited

U.S. PATENT DOCUMENTS

| | | | |
|---|---|---|---|
| 747,556 A | * | 12/1903 | Larmon ................. 99/574 |
| 822,105 A | | 5/1906 | Eklund |
| 1,170,839 A | * | 2/1916 | Molloy |
| 4,034,665 A | | 7/1977 | McFarland et al. ........... 99/574 |
| 4,353,931 A | | 10/1982 | Volk ........................ 426/483 |
| 4,448,115 A | | 5/1984 | Volk ........................ 99/574 |
| RE31,979 E | | 9/1985 | Volk ........................ 426/483 |
| 4,874,097 A | | 10/1989 | Argirladis .................. 209/616 |
| 5,245,918 A | | 9/1993 | Volk ........................ 99/574 |
| 5,329,845 A | | 7/1994 | Bichel ..................... 99/627 |
| 5,544,575 A | * | 8/1996 | Spry ....................... 99/628 |
| 5,879,734 A | | 3/1999 | Broyles .................... 426/481 |

FOREIGN PATENT DOCUMENTS

GR 65415 5/1980

* cited by examiner

Primary Examiner—Reginald L. Alexander
(74) Attorney, Agent, or Firm—Bennett Jones LLP

(57) ABSTRACT

An apparatus for separating hulled and unhulled pistachios includes a rotating roller and a conveyor for depositing pistachios onto the roller. Rotation of the drum frictionally separates hulled and unhulled pistachios.

16 Claims, 11 Drawing Sheets

PISTACHIO HULLER

BACKGROUND OF INVENTION

The present invention relates to an apparatus for hulling pistachio nuts and separating the hulled pistachios from the hulls.

Pistachio nuts have a hard shell around the edible kernel and a pericarp or hull which encases the shell. The hulling of pistachios is difficult and present some unusual problems. The hulls of pistachios are stronger, more tenaciously adherent to the shells, and more difficult to remove than the hulls of many nuts, particularly if the pistachio is not yet ripe. If the hull is not promptly removed from pistachios after harvest, it discolors the shells requiring that the normally attractive straw colored shells be colored to hide undesirable stains. For this reason, most commercial pistachios are dyed an unnatural and undesirable pink or red color to obscure the stains. Even when abundant hand labor is available, it is usually not feasible to hull sufficiently large volumes of pistachios soon enough after harvest to avoid shell discoloration. As a result, mechanical hullers of various configurations have been developed.

Mechanical hullers such as that disclosed in U.S. Pat. No. 4,034,665 use a great deal of water in the hulling process. As fresh water becomes a more expensive and scarce resource, using a large amount of water in the hulling process becomes less advantageous financially and environmentally.

Therefore, there is a need in the art for a pistachio hulling machine which may operate with minimum water usage or without water usage.

SUMMARY OF INVENTION

In general term, the invention provides a method and apparatus for hulling pistachio nuts and separating the hulls from the pistachio nuts. The pistachios to be processed are deposited in between counter-rotating rollers having a resilient, frictional and preferably textured outer surface. A main roller has a larger diameter than a satellite roller, however both rollers are rotated at the same rate. As a result, the outer surfaces of the main and satellite rollers travel at different speeds. The outer surface of both rollers may comprise a high-friction material such as a rubber. As a result, the friction created between the pistachio hull and the rollers ruptures the hull and peels it away from the pistachio shell. On many pistachios, the ruptured hull remains attached to the shell by a tag end. The pistachios and attached and unattached hulls then are dropped onto an elongate roller. The elongate roller separates the hulls from the pistachio shells and other debris. The hulls and debris drop underneath the elongate roller. The pistachio shells are augured to one end of the elongate roller by the elongate roller and collected for further processing.

BRIEF DESCRIPTION OF DRAWINGS

The invention will now be described by way of an exemplary embodiment with reference to the accompanying simplified, diagrammatic, not-to-scale drawings. In the drawings.

DETAILED DESCRIPTION

The present invention provides for an apparatus which hulls pistachio nuts and separates the hulls, both unattached and attached, from the pistachio nuts. When describing the present invention all terms not defined herein have their common art-recognized meanings. The following description is exemplary of a preferred embodiment of the invention and is not intended to be limiting of the claimed invention.

Figure 1:
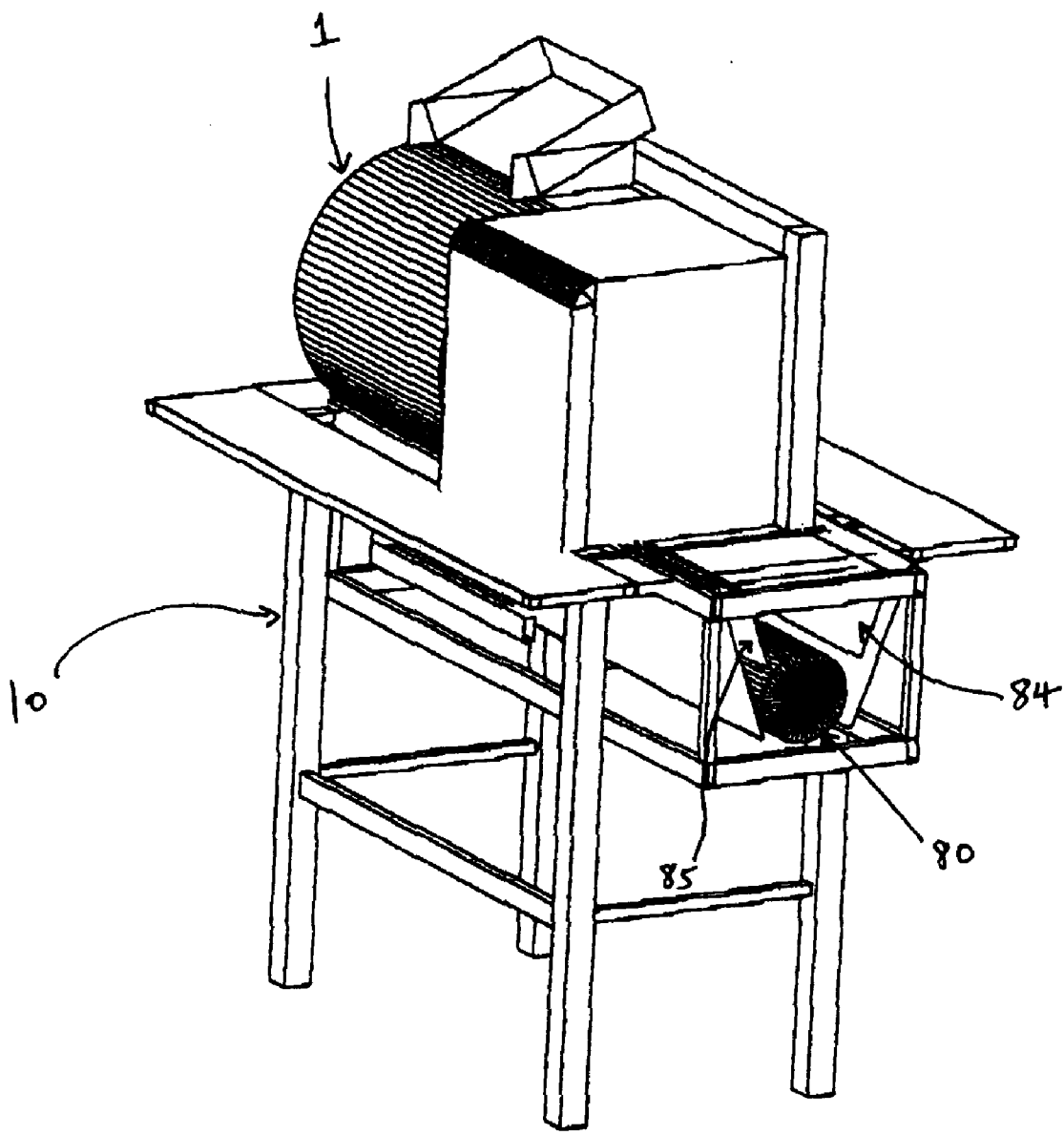
FIG. 1 is a pictorial view of one embodiment of the invention.
Figure 2:
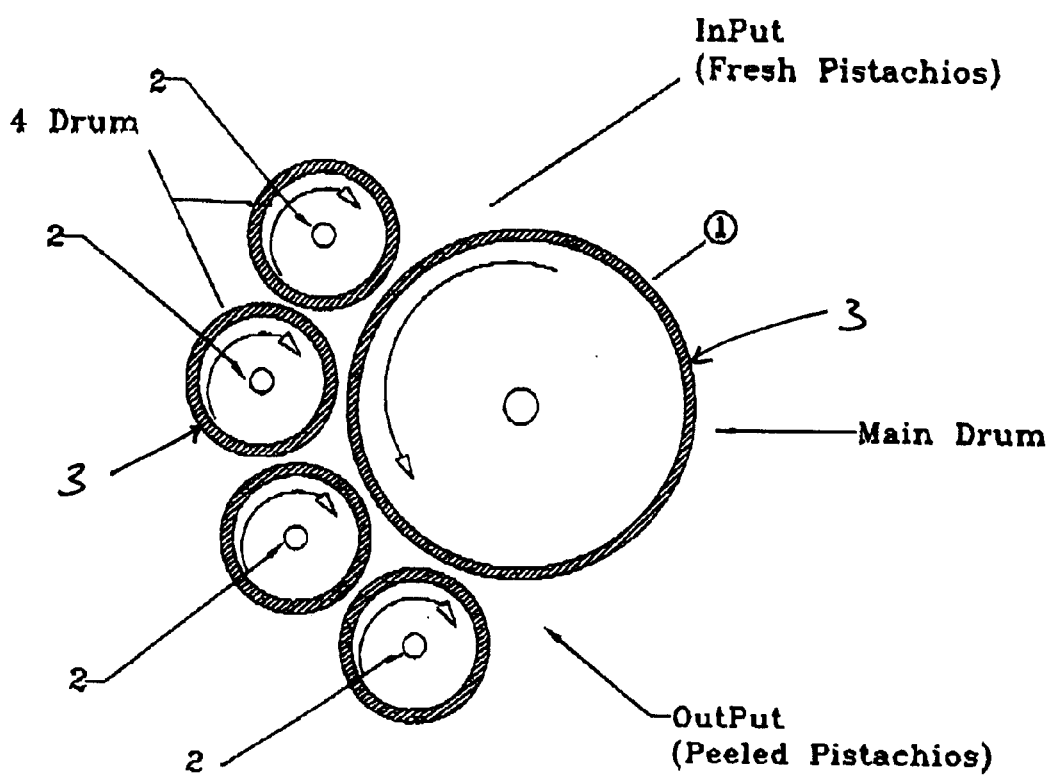
FIG. 2 is a cross-sectional view of the main roller and satellite rollers of one embodiment.
Figure 2A:
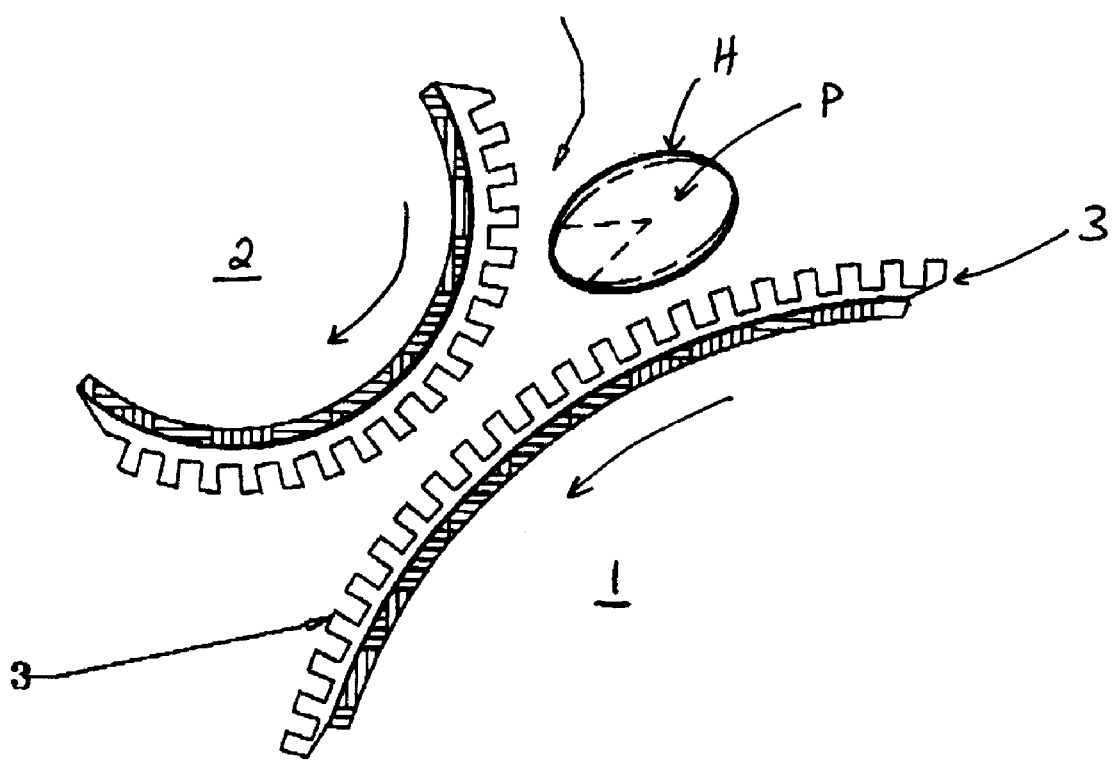
FIG. 2A illustrates the passing of a pistachio nut between the rollers.

The apparatus shown in the Figures comprises a frame (10) supporting a main drum or roller (1) covered with a textured resilient material (3) which in one embodiment is a rubber. In close proximity to the main roller (1) are four satellite drums or rollers (2) which are similarly covered with a textured resilient material. As depicted in FIG. 2, the satellite rollers (2) counter-rotate to the main roller (1). The textured surface of each of the main and satellite rollers may be of any configuration. In one embodiment, as shown in FIG. 2A, the texture comprises a plurality of square ridges and grooves which are aligned with the longitudinal axis of the main and satellite rollers. A pistachio (P) with an intact hull (H) will pass between the main and satellite rollers. Because the main roller has a larger diameter than the satellite rollers and they are rotated at the same speed, the outer surface of the main roller will travel faster than the outer surface of the satellite roller. As a result, the hull is removed from the pistachio as it passes between the main and satellite rollers.

Figure 3:
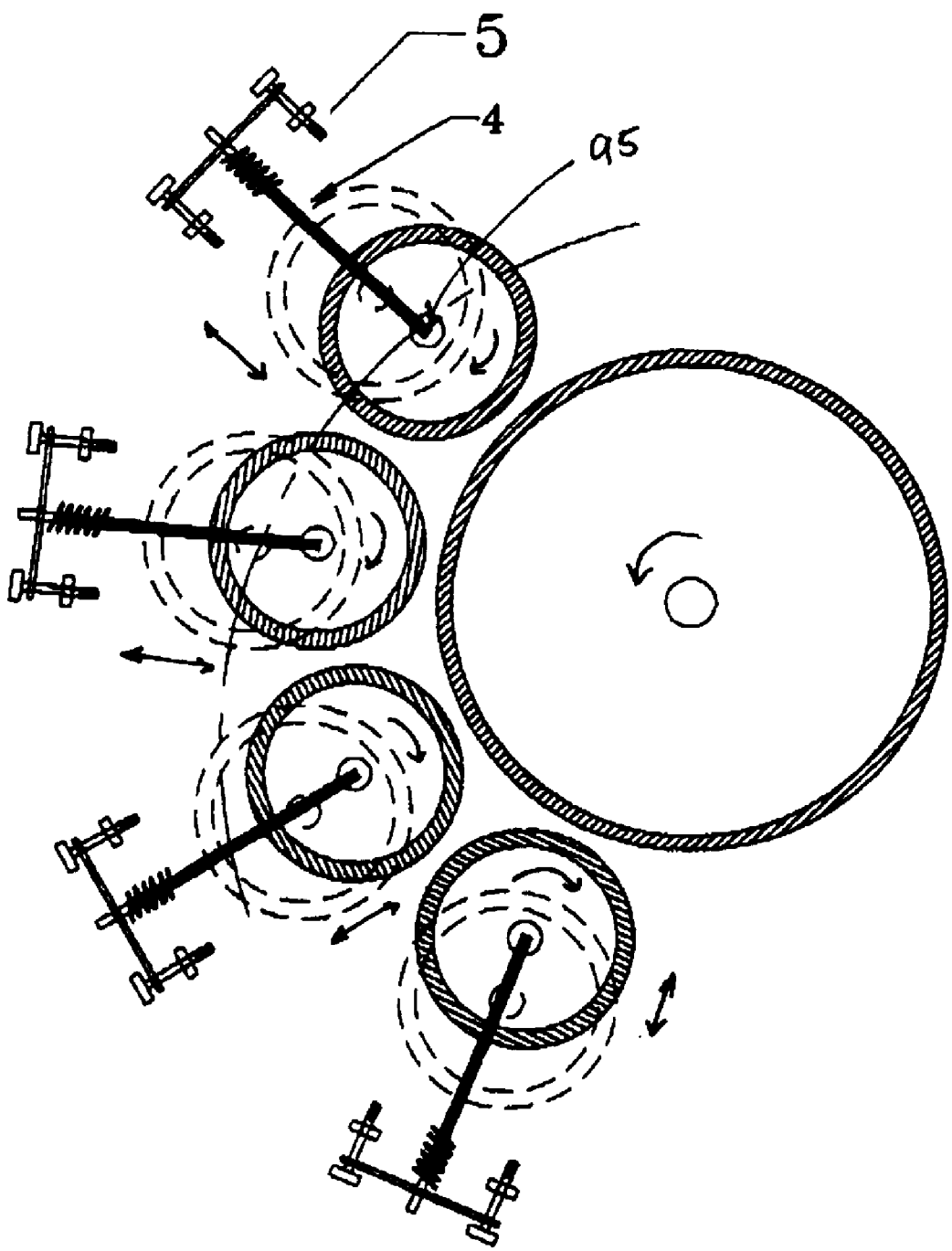
FIG. 3 is a similar view to FIG. 2 showing the adjustable motion of the satellite rollers.
Figure 4:
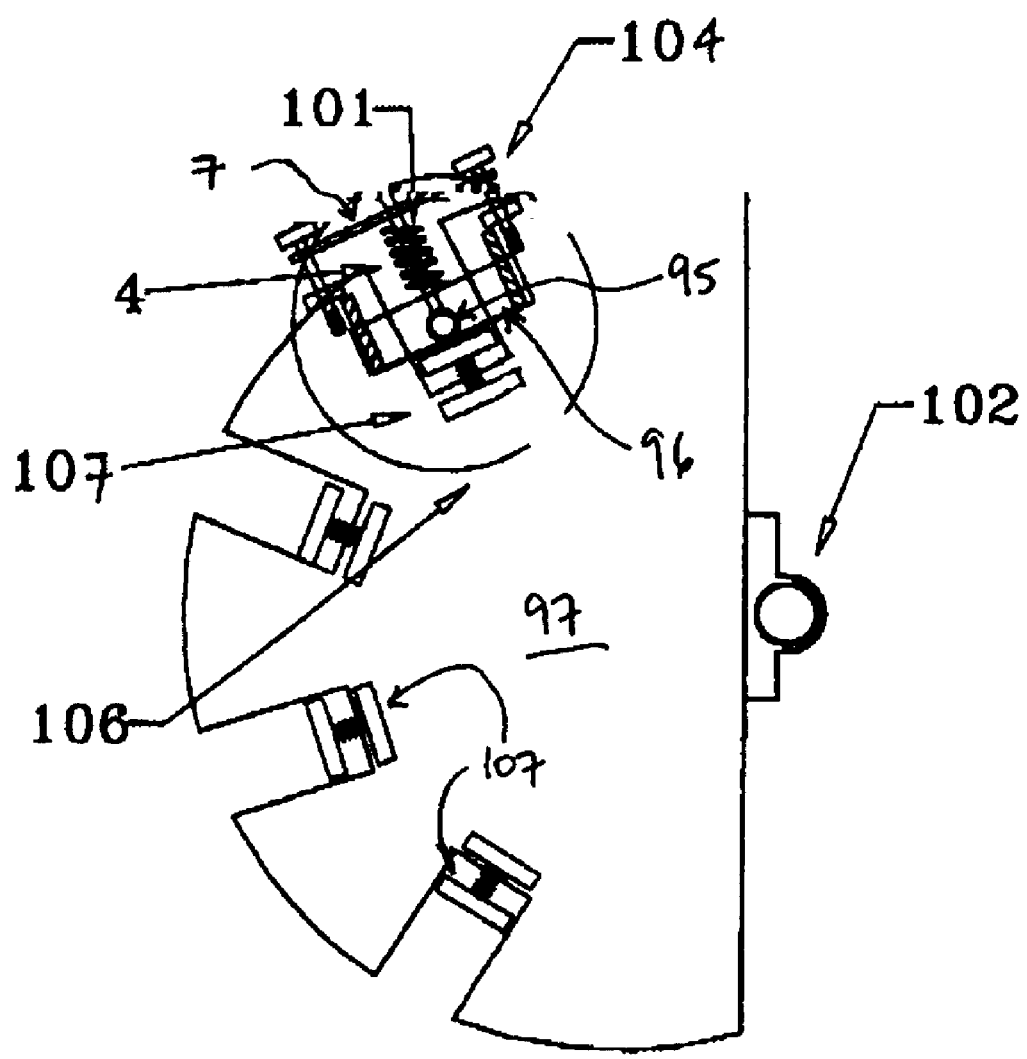
FIG. 4 is an end view of a mounting plate for the satellite rollers.
Figure 5:
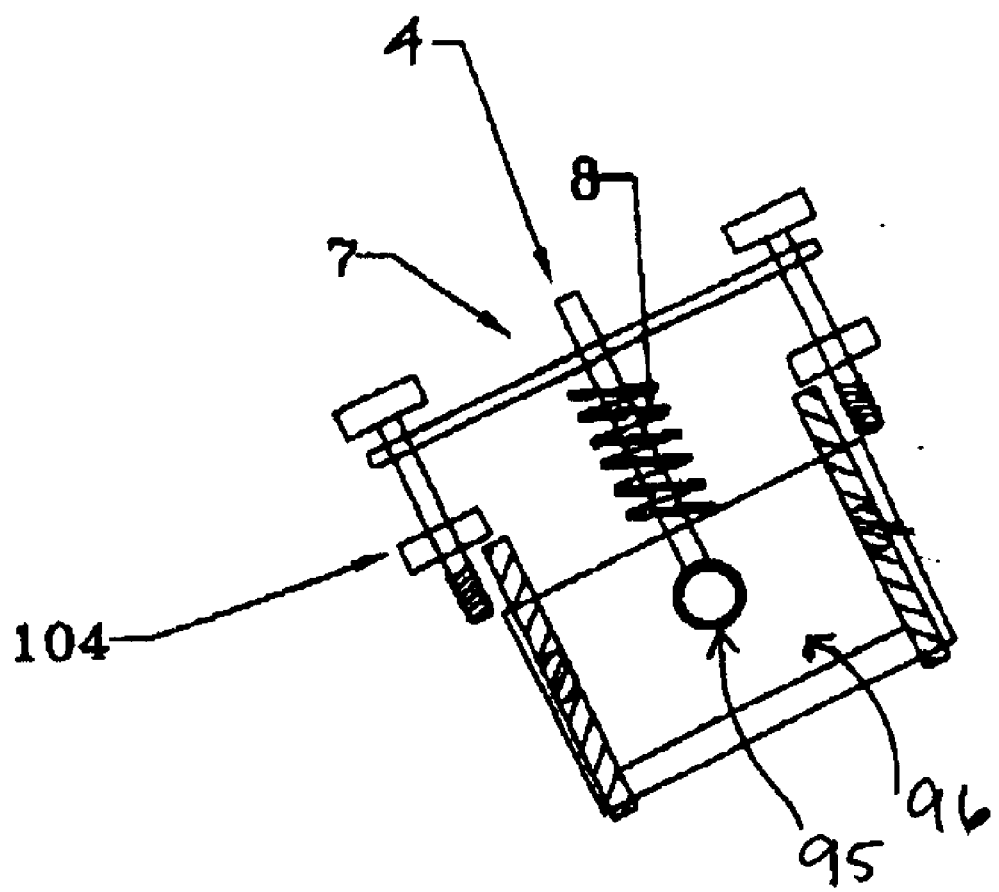
FIG. 5 is a detailed view of the biasing means for positioning the satellite rollers.

Each satellite roller is mounted so as to permit movement along a line radiating outward from the axis of rotation of the main roller, as is depicted in FIG. 3. This movement has the effect of varying the gap between the main (1) and satellite rollers (2). In one embodiment shown in FIG. 4, the satellite roller axles (95) are mounted to blocks (96) which travel within channels cut into chassis end plates (97). A constant force towards the main roller is applied to the blocks (96) by a biasing means, such as a coil spring (8) mounted on a guide rod (4). The spring (8) may be preloaded by an end plate (7) and adjusting screws (104) which compress and decompress the spring (8), as is shown in FIG. 5. As will be appreciated by those skilled in the art, when an object passes between the main roller (1) and the satellite roller (2), the satellite roller (2) will be displaced outward against the force of the spring (8). The spring will then urge the satellite roller back into position. In this manner, a constant force is applied to pistachios passing between the main and satellite rollers. The blocks (96) may also be resiliently supported from the inward side by a block and biasing spring (107) assembly.

The main roller (1) is also supported by the end plates (97) with bearing assemblies (102).

Figure 6:
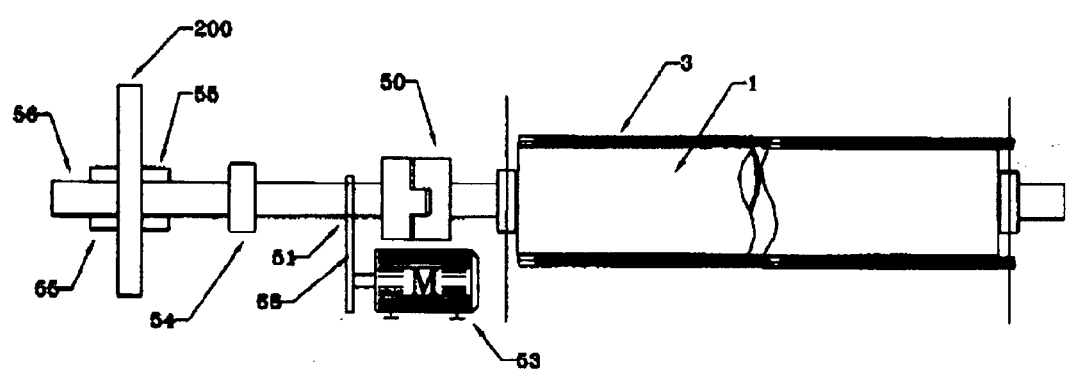
FIG. 6 is view of the drive mechanism for the main roller.

A drive mechanism for the main roller is shown in FIG. 6. An electric motor (53) actuates a chain (68) drive which rotates the drive shaft (56) by a sprocket (51). The drive shaft is supported by a base (200) with bearing assemblies (55). The drive shaft has a coupling (50) which facilitates removal of the main roller (1) for servicing, without disassembling the drive mechanism.

Figure 7:
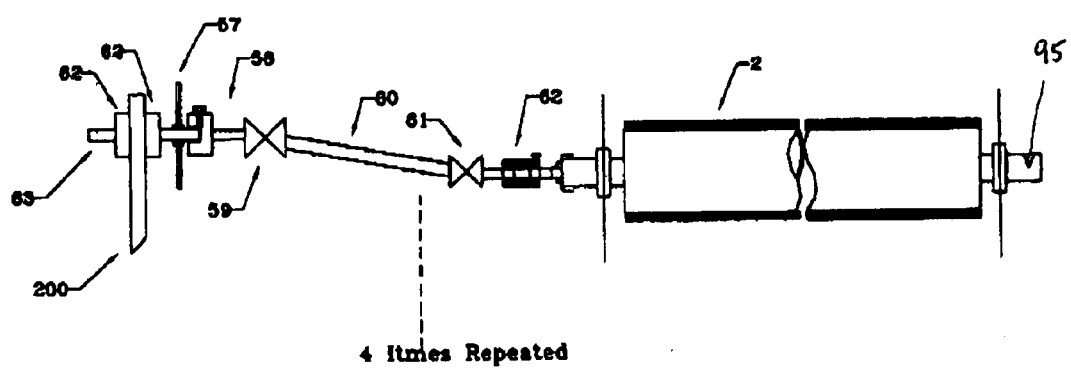
FIG. 7 is a view of the drive mechanism for one satellite roller.

The satellite rollers (2) are driven off of the main shaft (56). As shown in FIGS. 6 and 7, main shaft (56) has a drive sprocket (54) which drives a chain (63) which drives sprockets (57) on the satellite roller drive shafts (63) which is supported by bearings (62) and the base (200). The drive mechanism for the satellite rollers must allow for the movement of the satellite rollers and should preferably incorporate shock absorbing elements to avoid transmitting jarring shocks through the drive assembly. In one embodiment, the drive shaft (53) is connected to a bushing (58) and a universal joint (59). An intermediate drive shaft (60) is connected to a second universal joint (61) and another bushing (62) before engaging the satellite roller axle.

Figures 8, 9:
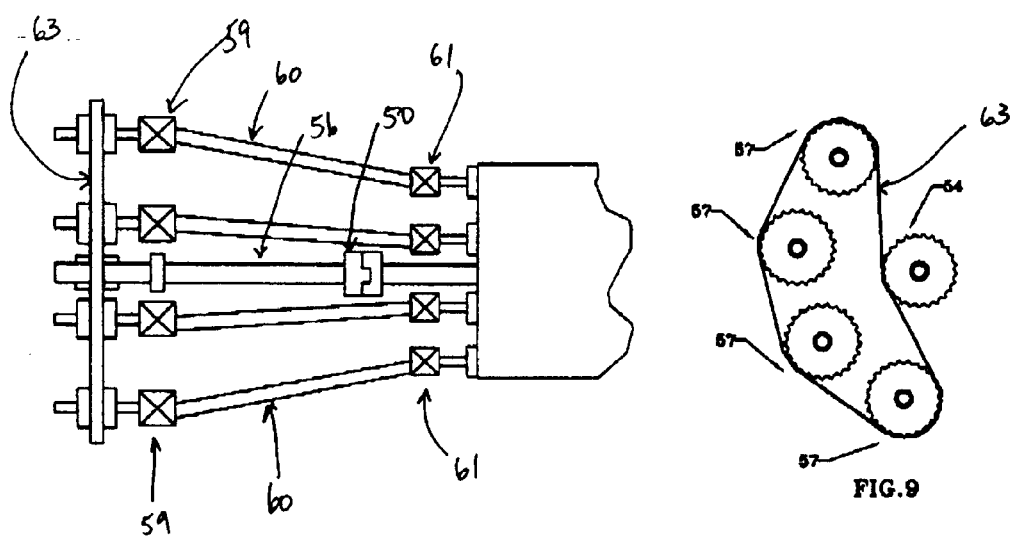
FIG. 8 is a view of the combined drive mechanism for the main and satellite rollers.
FIG. 9 is a view of the drive chain and sprockets for the main and satellite rollers.
Figure 10:
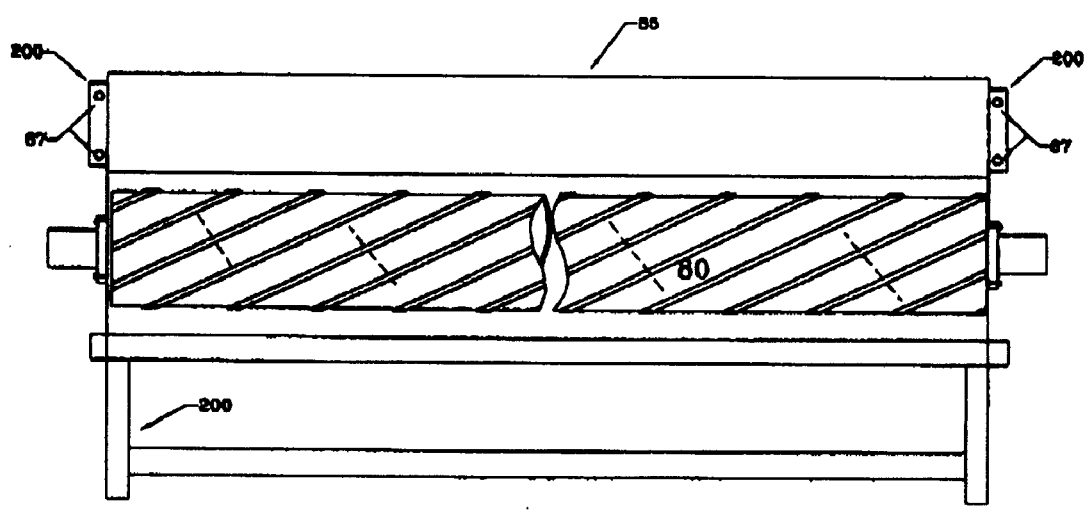
FIG. 10 is a view of an elongate roller of one embodiment of the invention.

The drive chain (63) is configured as shown in FIG. 9 to ensure the satellite rollers rotate in a direction counter to the rotation of the main roller. The drive sprockets are of equal size to ensure that the satellite rollers rotate at the same rate as the main roller. However, as referred to above, the main roller surface travels faster than the surface of the satellite rollers because of the larger diameter of the main roller.

The pistachios and hulls which pass between the main and satellite rollers are then dropped onto an elongate separation roller (80) which has a plurality of surficial helical friction strips (82). The friction strips (82) may be formed from a frictional material such as rubber. As the separation roller (80) rotates, the friction strips (82) cause the pistachios and hulls to move down towards one end of the separation roller. A channel above the separation roller (80) is formed by two guide plates (84, 85) which are positioned above the roller. As may be seen in FIGS. 11 and 12, the lower edges of the guide plates are spaced away from the separation roller so as to permit detached hulls and other small pieces of debris to pass under the guide plate and be removed. Hulls which have been ruptured but not detached from the pistachio shell will also pass under the guide plates and be removed by the action of the friction strips (82). Whole pistachios are kept in the channel by the guide plates, are moved towards one end by the helical friction strips (82) and are collected at one end of the separation roller.

Figures 11, 12:
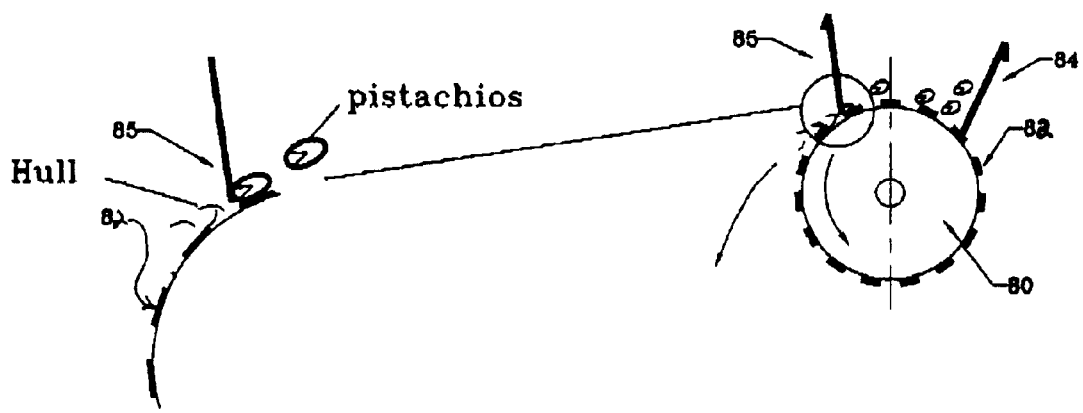
FIG. 11 is a vertical cross-sectional of the elongate roller of FIG. 10.
FIG. 12 is a detailed view of FIG. 11.

In a preferred embodiment, the guide plates (84, 85) are substantially perpendicular to the surface of the separation roller (80) as is shown in FIG. 12. The means (87) by which the guide plates are attached to the frame (10) may permit vertical adjustment of the guide plates so as to vary the gap between the guide plates and the separation roller.

In one embodiment, the separation roller may be substantially horizontal. In another embodiment, the separation roller may be inclined such that pistachios retained in the channel are transported up the roller. The degree of inclination may be about 15° from the horizontal.

In one embodiment, the apparatus may comprise an additional separation roller which is used to wash the pistachios as well as further hull and debris separation. Alternatively, a single combined separation/washing roller may be used. A series of water spray jets may be directed at the channel between the guide plates to wash the pistachios retained in the channel.

As will be apparent to those skilled in the art, various modifications, adaptations and variations of the foregoing specific disclosure can be made without departing from the scope of the invention claimed herein.

What is claimed is:

1. An apparatus to hull pistachio nuts comprising:
   a chassis frame;
   a main roller having a textured outer surface rotatably mounted to the chassis;
   at least one satellite roller having a textured outer surface rotatably mounted to the chassis in close proximity to the main roller such that the axis of rotation of the satellite roller is parallel to the axis of rotation of the main roller;
   an elongate rotating separation roller having a outer surface comprising a helical friction strip, wherein said separation roller is mounted below the main and satellite rollers;
   a first and second guide plates mounted spaced apart and substantially parallel to each other and the separation roller, above the separation roller; and
   means for rotating the main roller and counter-rotating the at least one satellite roller and means for rotating the separation roller.

2. The apparatus of claim 1 comprising four satellite rollers.

3. The apparatus of claim 1 wherein the textured outer surface of the main and satellite rollers comprises a plurality of square ridges and grooves.

4. The apparatus of claim 1 wherein the width of each square ridge and groove is substantially similar.

5. The apparatus of claim 3 wherein the textured outer surface of the main and satellite rollers comprises a resilient, frictional material.

6. The apparatus of claim 4 wherein the resilient, frictional material comprises rubber.

7. The apparatus of claim 1 wherein each satellite roller is moveable along a line radiating outward from the centre of the main roller and further comprising biasing means for urging each satellite roller closer to the main roller.

8. The apparatus of claim 6 wherein the fixed position of each satellite roller and biasing means is adjustable.

9. The apparatus of claim 1 wherein the separation roller comprises a plurality of helical friction strips, substantially equally spaced apart along the roller surface, and slightly raised above the roller surface.

10. The apparatus of claim 1 wherein the first guide plate is spaced apart from the outer surface of the separation roller by a distance which permits attached and detached pistachio hulls to slide under the guide plate but which prevents pistachio shells to pass thereunder.

11. The apparatus of claim 1 wherein the first guide plate is angled approximately 90° degrees from a line tangent with the outer surface of the separation roller at the point closest to the first guide plate.

12. The apparatus of claim 1 wherein the second guide plate is angled approximately 90° degrees from a line tangent with the outer surface of the separation roller at the point closest to the first guide plate.

13. The apparatus of claim 1 wherein the separation roller is inclined such that rotation of the separation roller helical friction strips causes pistachio nuts to move upward.

14. The apparatus of claim 13 wherein the separation roller is inclined upward at about 15° from the horizontal.

15. The apparatus of claim 1 wherein the main roller and satellite roller are counter-rotated at the same rate and wherein the main roller has a larger diameter than the satellite roller.

16. An apparatus to hull pistachio nuts comprising:

a chassis frame;

a main roller having a textured outer surface rotatably mounted to the chassis;

at least one satellite roller having a textured outer surface rotatably mounted to the chassis in close proximity to the main roller such that the axis of rotation of the satellite roller is parallel to the axis of rotation of the main roller;

an elongate rotating separation roller having a outer surface comprising a helical friction strip, wherein said separation roller is mounted below the main and satellite rollers;

a first and second guide plates mounted spaced apart and substantially parallel to each other and the separation roller, above the separation roller; and means for rotating the main roller and counter-rotating the at least one satellite roller and means for rotating the separation roller;

wherein the main roller and satellite roller are counter-rotated at the same rate and wherein the main roller has a larger diameter than the satellite roller.

* * * * *

UNITED STATES PATENT AND TRADEMARK OFFICE
CERTIFICATE OF CORRECTION

PATENT NO.    : 6,422,137 B1                                                Page 1 of 1
DATED         : July 23, 2002
INVENTOR(S)   : Mohammad Nakhei-Nejad It is certified that error appears in the above-identified patent and that said Letters Patent is hereby corrected as shown below:

<u>Title page,</u>
Item [76], Inventor: change "Saskatchowan" to read -- Saskatchewan --
Item [57], ABSTRACT, remove the Abstract as Noted and replace it with:
-- An apparatus for hulling pistachio nuts and separating the hulls from the pistachio nuts, includes a main roller and a plurality of satellite rollers. The main and satellite rollers are covered with a resilient material and counter-rotate. Pistachio nuts are dehulled as they pass between the main and satellite rollers. --

Signed and Sealed this

Eighth Day of April, 2003

JAMES E. ROGAN
*Director of the United States Patent and Trademark Office*